United States Patent [19]

Najvar

[11] 3,892,819

[45] July 1, 1975

[54] IMPACT RESISTANT VINYL ESTER RESIN AND PROCESS FOR MAKING SAME

[75] Inventor: Daniel J. Najvar, Lake Jackson, Tex.

[73] Assignee: The Dow Chemical Company, Midland, Mich.

[22] Filed: Mar. 21, 1973

[21] Appl. No.: 343,716

[52] U.S. Cl............. 260/836; 260/835; 260/837 R; 260/2.5 B; 260/42.28; 204/159.15; 204/159.16
[51] Int. Cl............................................. C08g 45/04
[58] Field of Search........... 260/836, 837 R, 837 PV

[56] References Cited
UNITED STATES PATENTS
3,674,893  7/1972  Novak................................. 260/836
3,808,114  4/1974  Tsuchihara et al. ................ 260/836

*Primary Examiner*—John C. Bleutge
*Assistant Examiner*—J. Ziegler
*Attorney, Agent, or Firm*—H. L. Aamoth

[57] ABSTRACT

Vinyl ester resins with improved impact resistance and other benefits and advantages may be obtained by a process modification wherein up to 20 percent of the unsaturated monocarboxylic acid, which is reacted with a polyepoxide, is replaced by an equivalent amount of a liquid carboxy terminated polydiene rubber capable of reacting with epoxy groups to form a chemically bound molecule.

16 Claims, No Drawings

IMPACT RESISTANT VINYL ESTER RESIN AND PROCESS FOR MAKING SAME

BACKGROUND

The preparation of a thermosettable vinyl ester resin by the reaction of an unsaturated monocarboxylic acid such as methacrylic acid with a polyepoxide is known. While the physical properties of the cured resin can be varied depending on the choice of reactants, the choice of monomer copolymerizable with the resin and the like, the properties may also be modified by adding various materials to the resin. Inert reinforcing materials such as glass fibers and inert fillers such as $CaCO_3$ or kaolin clay are commonly employed both to improve properties and to reduce costs.

A variety of other additives are also known: thickening agents, thermoplastic low profile (smooth surface) additives, rubbery polymers to improve impact resistance, and the like. However, compatibility of these additives with the resin may frequently be a major problem which calls for other additives to stabilize the system. Some of the additives, unfortunately, are also susceptible to removal from the cured resin by contact with solvents and the like. Consequently, the advantages of certain additives may be lost or diminished in value because of these problems.

It would be desirable to have a thermosettable resin that inherently provides all of the desired properties. This ideal may never be reached but an object of this invention is to inherently provide improved impact resistance in the vinyl ester resin by chemically incorporating a polydiene rubber into the thermosettable resin itself. Other objects, benefits and advantages of the invention will become readily apparent from the description which follows.

SUMMARY

The objects and benefits of this invention are obtained by a modified process for making vinyl ester resins wherein a polyepoxide is reacted with an unsaturated monocarboxylic acid and a liquid carboxy terminated polydiene rubber. The combined acid equivalents of said unsaturated acid and polydiene rubber ranges from about 0.8 to 1.2 equivalents per epoxide equivalent. At least about 80 percent of the acid equivalents comprises the unsaturated acid and the balance between 0.01 and 20 percent comprises the polydiene rubber, provided that the polydiene rubber content of the resin is at least about 4 weight percent.

The novel vinyl ester resins are useful as powder coatings as well as in admixture with copolymerizable monomers to prepare reinforced plastic articles.

DESCRIPTION

Terminally unsaturated vinyl ester resins possess a number of outstanding properties which account for their commercial acceptance in such areas as molding resins, corrosion resistant reinforced plastic pipe and other vessels, glass fiber laminates, and the like. But like most thermosettable resins, vinyl ester resins do not possess outstanding impact resistance.

While impact resistance of vinyl ester resins can be improved by adding certain polydiene rubbers (see U.S. Pat. No. 3,674,893), it would be desirable to avoid the need for such additives and provide the impact resistance as an inherent property of the resin. Additives to any thermosettable resin frequently result in other problems such as instability, viscosity control and the like which can be avoided if the need for the additive can be eliminated in the first place.

Vinyl ester resins are generally prepared by reacting together about equivalent amounts of an unsaturated monocarboxylic acid and a polyepoxide. An early patent U.S. Pat. No. 3,179,623, describes the above reactions and resins. Further details about the resins, which are called vinyl ester resins herein, and conditions and methods of making them can be found in the following U.S. Pat. Nos.: 3,301,743; 3,317,465; 3,377,406; 3,256,226 and 3,367,992. All the above patents are incorporated herein by reference.

Briefly, any of the known polyepoxides may be employed in the preparation of the vinyl ester resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized diunsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having equivalent weights per epoxide group of about 150 to 1500, preferably about 250 to 700 and more preferred about 400 to 600. Generally, as the epoxide equivalent weight decreases the amount of carboxy terminated rubber increases. The polyepoxides are characterized by the presence of more than one epoxide group per molecule.

Unsaturated monocarboxylic acids include acrylic acid, methacrylic acid, halogenated acrylic or methacrylic acids, cinnamic acid and the like and mixtures thereof, and hydroxyalkyl acrylate or methacrylate half esters of dicarboxylic acids as described in U.S. Pat. No. 3,367,992 wherein the hydroxyalkyl group preferably has from two to six carbon atoms. Said acid is generally reacted with the polyepoxide in the proportions of about 1 equivalent of acid per each equivalent of epoxide, but the proportions of equivalents may range from about 0.8/1 to 1.2/1, respectively.

According to this invention improved impact resistance is obtained by replacing up to about 20 percent of the equivalents of unsaturated acid with an equivalent amount of a liquid carboxy terminated polydiene rubber. By liquid it is meant to include the low molecular weight polydienes of about 2000 to 20,000 molecular weight and preferably about 3,000 to 10,000. Of the combined acid equivalents employed in the process at least about 80 percent comprises said unsaturated acid and the balance between about 0.01 and 20 percent comprises said polydiene, provided that the polydiene rubber content of the resin is at least about 4 weight percent. By carboxy terminated is meant that the polydiene rubber is terminated at each end with an acid carboxy, —COOH, group.

The particular liquid carboxy terminated polydienes used in this invention may be prepared by any suitable means. One procedure involves solution polymerization of a conjugated diene monomer in the presence of an organo metal catalyst. The lithium catalysts and in particular the dilithium catalysts such as dilithiobutane, dilithium stilbene, dilithium napthalene and the like are preferred. By employing dilithium catalysts the polyr obtained is terminated at each end by a lithium m. Treatment of said polymer with carbon dioxide laces the lithium atoms with carboxy lithium salt ups. As a final step the polymer is treated with acid convert the lithium salt to the free acid form. Car- y terminated polymers of various conjugated dienes mixtures of same may be prepared in this manner. e conjugated dienes may have from 4 to 12 carbon ms and preferably from 4 to 8. Typical monomers lude 1,3-butadiene, isoprene, piperylene, methyl- tadiene, 3,4-dimethyl-1,3 hexadiene and the like.

also included within the definition of polydiene rub- s are carboxy terminated liquid copolymers of a jugated diene and a copolymerizable vinyl mono- r. Suitable monomers include alkenyl aromatics h as styrene, vinyl toluene, α-methyl styrene etc.; iles such as acrylonitrile, methacrylonitrile, etc.; ac- te and methacrylate esters such as the methyl, yl, propyl, cyclohexyl etc. esters; heterocyclic nitro- -containing monomers such as the various vinyl pyr- e isomers, etc.; vinyl chloride, vinylidene chloride, thyl vinyl ether and the like. Said copolymers should tain at least 40 weight percent of diene and corre- ndingly from 0 to about 60 weight percent of at st one copolymerizable vinyl monomer different m said diene monomer.

referred copolymer polydienes are the liquid car- y terminated acrylonitrile/butadiene copolymers particularly preferred are those copolymers pre- ed from 12 to 25 percent acrylonitrile and 88 to 75 cent butadiene.

he preparation of carboxy terminated polydienes is ll known. U.S. Pat. No. 3,135,716 is typical of the art cribing a process for preparing terminally reactive ymers as well as the various reactions which may be ployed to introduce different functional terminal ups. The disclosure of U.S. Pat. No. 3,242,129 is typical of the art, especially the portions contained olumns 6–8 thereof. The above two patents are in- porated herein by reference. Numerous other pa- ts could be cited but are considered unnecessary.

he vinyl ester resins typically are prepared in the sence of catalysts such as the organophosphonium s, tertiary amines such as 2,4,6-dimethylaminomethyl) phenol [DMP-30] and the . Various vinyl polymerization inhibitors such as hy- quinone or its methyl ether and the like may be sent during the reaction or added after the resin ming reaction. If desired the reaction may be run in inert solvent, preferably one which can be readily oved by evaporation etc. after the resin has been pared. The carboxy terminated polydiene may be cted with the polyepoxide first followed by addition reaction of the unsaturated monocarboxylic acid both acid reactants may be added and reacted with polyepoxide at the same time.

he polydiene rubber modified vinyl ester resin pro- ed herein typically contains terminal polymerizable ups and associated therewith a hydroxyalkylene up, e.g. —CH$_2$CH(OH)CH$_2$—, formed by the reac- n of the acid carboxy group with the epoxide group. is hydroxyl group may be used for further modifica- n, e.g. by a post-reaction with a dicarboxylic acid an- lride in proportions up to about 1 mole per equiva- t of hydroxyl. A modification of this kind is dis- sed in U.S. Pat. No. 3,564,074. Other materials ich are reactive with hydroxyl groups, e.g. isocya- nates, acyl halides, etc. may be used to modify the vinyl ester resin.

Both saturated and unsaturated anhydrides are useful in said post reaction. Suitable dicarboxylic acid anhydrides containing ethylenic unsaturation include maleic anhydride, the halogenated maleic anhydrides, citraconic anhydride, itaconic anhydride and the like and mixtures thereof. Saturated dicarboxylic acid anhydrides include phthalic anhydride, tetrabromophthalic anhydride, chlorendic anhydride, anhydrides of aliphatic unsaturated dicarboxylic acid and the like.

The rubber modified vinyl ester resins are higher molecular weight resins by virtue of chemically combining the carboxy terminated polydiene rubbers into the resin structure. Accordingly, many of the resins are suitable as powder coating materials. A mixture of the powdered resin with a peroxide or other catalyst may be readily cured at an elevated temperature. The pendant carboxyl groups are of importance in powder coatings since they can be reacted with metal oxides to make solid powdered even in the presence of liquid monomers.

The resins are more commonly used in admixture with a copolymerizable monomer to prepare laminates, glass reinforced plastic pipe, reinforced molded parts, and the like. The rubber modified vinyl ester resin may be combined with up to 60 to 70 weight percent of monomer. The proportions will vary, somewhat depending on the monomer selected, other additives employed and other factors. A variety of copolymerizable monomers are disclosed in the vinyl ester patents previously referred to. Typical monomers are styrene, vinyl toluene, halogenated styrenes, alkyl substituted styrenes, alkyl substituted styrene, acrylic and methacrylic esters, hydroxyalkyl esters of acrylic and methacrylic acid, and the like. More usually the monomer content will range from about 30 to 60 weight percent.

The choice of monomer is also based on whether the resin is to be cured by thermal and/or chemical means or by high energy radiation. With chemical catalysts (e.g. peroxides, persulfates, diazo compounds, etc.) and/or heat styrene is a common monomer because of its low cost and availability as well as the properties obtained. However, to minimize the radiation dosage needed to cure monomers other than aromatic monomers may be employed such as butyl acrylate and hydroxyalkyl acrylates.

As indicated, the rubber modified vinyl ester resin may be cured (thermoset) by various means. Cure accelerators such as the metal organic acid salts, e.g. cobalt naphthenate, or tertiary amines such as N,N-dimethyl toluidine are frequently used with chemical catalysts. Sensitizers or photoinitiators which reduce the radiation dosage may also be employed with radiation, especially with ultra violet light. Other materials may be added to the resin such as inert reinforcing fibers, e.g. glass, asbestos, carbon, etc.; inert fillers such as kaolin clay, CaCO$_3$ etc.; mold release agents, thickeners, other pigments, thermoplastic low-profile additives, density reducers such as glass or phenolic microballons, blown saran microspheres and the like.

The improved impact resistance of the rubber modified vinyl ester resins makes the resin especially useful in coatings and for molded articles. Of particular interest are molded parts such as motor housings for power mowers, boats and recreation products, automotive parts such as panels and housings, molded furniture containing blown saran microspheres where improved toughness and durability are required in medium density syntatic foams for chair legs and arms, doors, back-up for acrylic faced bath tubs, lavatories, etc.

The invention will be further illustrated by the following non-limiting examples. All parts and percentages are by weight unless otherwise specified.

EXAMPLE 1

In a suitable reactor 455 parts of a glycidyl polyether of bisphenol A having an epoxide equivalent weight (EEW) of 189 (D.E.R.331) was reacted with 154 parts of bisphenol A in the presence of 0.5 part of t-butyl phosphonium acetate at 150°C. The reaction exothermed to 190°C and yielded a polyepoxide resin with an EEW of about 600.

After cooling the following were added to the reactor: 76 parts methacrylic acid, 1.2 parts DMP-30 catalyst, 228 parts carboxy terminated copolymer of butadiene-acrylonitrile (82:18) containing 2.5% carboxy, —COOH(Hycar CTBN, Goodrich Chemical Co.) and 0.17 part of hydroquinone. The reaction was continued at 120°–130°C until the percent carboxy of the resin was 1.15%. The resin was then poured out in thin sheets to cool. This resin contained about 25% of said rubber. Additional resins containing decreasing amounts of said rubber were prepared in a similar manner, substituting an equivalent amount of methacrylic acid for the amount of the decrease in rubber content. A portion of each of the resins was powdered, mixed with 1% dicumyl peroxide, cured at 280°F and post-cured at 100°C for 30 minutes. A control resin with no rubber was made for comparison purposes.

| Resin | % Rubber | Heat Distortion 264 psi | Notched Izod Impart, Ft-lb/inch |
|---|---|---|---|
| A | 0 | 184 | 0.3 |
| B | 5.8 | 176 | 0.4 |
| C | 11.1 | 166 | 0.4 |
| D | 15.7 | 157 | 0.5 |
| E | 25 | 140 | 1.02 |

As noted each of the uncured resins was non-blocking at 70°F and could be powdered or flaked. Similar results are obtained if the copolymer is replaced by an equivalent amount of a carboxy terminated polybutadiene.

Tests were also made with some of the resins diluted to 50% styrene monomer. Clear castings were made by adding 1% benzoyl peroxide, curing at 100°C for 1 hour and post-curing at 130°C for 45 minutes. Clear castings were then made by curing with 1% benzoyl peroxide (BPO) at 80°C for 6 hours and post curing for 30 minutes at 250°F. The casting at a 10% rubber level could be hammered and was slightly malleable whereas at 2.5% rubber the castings were brittle and shattered easily.

EXAMPLE 2

Similar to example 1 a higher molecular weight polyepoxide was first prepared by reacting 6.5 lbs of bisphenol A with 6.58 lbs of D.E.R. 736 (an aliphatic diepoxide with an EEW of 175–205) in the presence of t-butyl phosphonium acetate catalyst. Then 4.05 lbs of a carboxy terminated butadieneacrylonitrile rubber similar to example 1, 6.97 lbs of methacrylic acid were added and reacted using a catalyst (DMP-30) and hydroquinone as an inhibitor. After the reaction was completed 36 lbs of styrene was added and mixed with the resin. The liquid resin had a viscosity of 57.7 cs.

The following molding formulation was prepared.

| | | |
|---|---|---|
| Resin | 100 | parts |
| Nevada sand | 37.5 | " |
| Milled glass fiber | 25 | " |
| ASP-400 Kaolin clay | 12.5 | " |
| Cab-O-Sil (silica) | 0.5 | parts |
| N,N-dimethylaniline (DMA) | 0.4 | " |
| Cadox 40E (40% benzoyl peroxide | 5.0 | " |

A pipe collar was molded directly into a 12 inch pipe using the above formulation at 150°F. The collar was demolded about 15 minutes after the formulation was accelerated with the DMA promoter. The collar was aged for 24 hours and then tested for impact resistance. The collar passed a 20 foot drop test without breaking.

Clear castings were also prepared from the resin using two different catalyst systems.

| | 1% benzoyl peroxide 0.2% DMA | 0.5% Co Naph 1.5% MEK Peroxide |
|---|---|---|
| Tensile, psi | 6,820 | 5,940 |
| Elongation, % | 15 | 38 |
| 264 psi, HDT | 120°F | — |

EXAMPLE 3

Another group of resins was prepared by heating together in the presence of a catalyst a polyepoxide or mixtures thereof, methacrylic or acrylic acid and a carboxy terminated butadiene/acrylonitrile rubber similar to that used in example 1. Heating was continued until the carboxy content reached a low value of less than 2%. Styrene monomer was then added. Clear castings were cured with 1% BPO and 0.2% DMA for one hour at 80°C and post cured at 250°C for 1 hour. The compositions of the resins and their physical properties are recorded in the following tables.

| Resin | Visc.,* cps | Izod Notched Impact Ft-lbs/in. | % Elong. | HDT, °F 264, psi | Tensile psi | Flex. Str psi | Flex Mod psi ×10⁵ |
|---|---|---|---|---|---|---|---|
| A | 300 (N) | 0.380 | 9 | 215 | 11,000 | 17,300 | 4.3 |
| D | 2000 (T) | 0.595 | 25 | 174 | 7,170 | 11,900 | 3.2 |
| E | 2600 (T) | 0.563 | 25 | 124 | 4,000 | 5,700 | 2.1 |

*N-newtonian; T-thixotropic

Additional tests were made with resin E in which an unmodified vinyl ester resin (prepared by reacting equivalent amounts of an epoxy novolac, D.E.N. 438, with methacrylic acid) diluted to 25% styrene was blended therewith in varying amounts to vary the amount of rubber in the total resin. Clear castings were

Composition

| Resin | D.E.R. 331[1] | D.E.R. 732[2] | D.E.R. 741[3] | MAA[4] | AA[4] | Rubber Parts | % | Styrene |
|---|---|---|---|---|---|---|---|---|
| A | 760 | — | — | — | 288 | 112 | 7 | 500 |
| B | 570 | 325 | — | 335 | — | 140 | 7 | 590 |
| C | 570 | 325 | — | 335 | — | 310 | 14 | 660 |
| D | 570 | — | 370 | 335 | — | 145 | 7 | 610 |
| E | 570 | 325 | — | 335 | — | 0 | 0 | 530 |

[1] aromatic polyepoxide, EEW 186–192
[2] aliphatic polyepoxide, EEW 305–335
[3] mixture of aromatic and aliphatic polyepoxide, EEW 364–380
[4] MAA - methacrylic acid; AA - acrylic acid

Properties

| Resin | Izod Impact Ft-lbs/inch Unnotched | Izod Impact Ft-lbs/inch Notched | Flexural Strength, psi | Barcol Hardness | HDT, °F 264 psi |
|---|---|---|---|---|---|
| A | 3.5 | 0.207 | 13,000 | 24 | 167 |
| B | 7.7 | 0.422 | 9,000 | 23 | 149 |
| C | 10.5 | 0.552 | 4,500 | 0 | — |
| D | 7.2 | — | 11,300 | 27 | 167 |
| E | 4.7 | 0.141 | 15,000 | 40 | 177 |

EXAMPLE 4

Variations in the previous examples may be made. The procedure of example 1 was changed by reacting the polyepoxide, the polydiene rubber and the bisphenol A together first at 140°–160°C. After cooling to 90°C the methacrylic acid was added and reacted. The epoxy and the rubber may be combined first and heated followed by addition of the bisphenol A and heating until desired epoxide equivalent weight is produced. Other polyepoxides which were used in the preparation of the vinyl ester resins of this invention included an epoxy novolac (D.E.N. 431) with an EEW of 172–179 and flexible polyepoxides with an EEW of 305–335 (D.E.R. 732) and 364–380 (D.E.R. 741). The CBN rubbers may be replaced by an equivalent amount of any of the commercial carboxy rubbers such as Butarez CTL I and II (Phillips Petroleum), Telogen T (General Tire & Rubber Co.) or HC-434 (Thiokol Chemical Co.).

EXAMPLE 5

The polydiene rubber modified vinyl ester resins have improved adhesive properties as well as impact resistance. Resins A, D and E of example 1 were used. In addition Resin A (0% rubber) was physically blended with the polydiene rubber used in preparing Resin D and E to a 12.5% rubber level. All resins were diluted to 50% styrene.

An adhesive formulation with each resin was prepared by blending 20 parts per 100 parts of resin (phr) MD-101 aluminum powder and 1 phr benzoylperoxide. Lap shear specimens were prepared according to ASTM-1002 using chromate etched aluminum strips, 1 × 4 × .064 inches. The adhesives were cured at 250°F for 30 minutes and after cooling lap shear values were determined.

| Resin | Percent Polydiene Rubber | Lap Shear psi |
|---|---|---|
| A | 0 | 3270 |
| D | 7.7 | 4980 |
| E | 12.5 | 3635 |
| Blend* | 12.5 | 325 |

*Blend of rubber and Resin I,A.

The improvement is apparent and is particularly evident over the blended resin where the added rubber detracted from the lap shear value.

EXAMPLE 6

Carboxy rubber modified vinyl ester resins were compared to comparable resins without said rubber. McGarey cleavage tests were made by preparing test bars 6 × 1.2 × 0.25 inches in which a lengthwise cut was made on each side of the bar to one-third the thickness of the bar. At one end an initial 1 inch cut was made all the way through the bar to help initiate splitting. In each case the resin was cured with 1% benzoyl peroxide catalyst for 6 hours at 80°C followed by 45 minutes at 250°F.

The test bars were then split the length of the cut obtaining a stress-strain curve. Stress was applied at a rate of 0.05 inches per minute. The area under the plotted curve was taken to be representative of the work required to form the new split surface. At the same styrene level the test bar with no rubber content in the resin had an area under the stress-strain curve of 190 whereas the carboxy polydiene rubber containing resin had an area of 2350. The split in the latter case also showed a great deal of stress whitening along the crack propagation line which is an indication of toughness.

What is claimed is:

1. A process for preparing a thermosettable resin having improved impact resistance in the thermoset state which comprises simultaneously reacting the epoxide moieties of a polyepoxide having an average of more than one epoxide group per molecule with the acid moieties of an unsaturated monocarboxylic acid and a liquid carboxy terminated polydiene rubber wherein the combined acid equivalents of said unsaturated acid and said polydiene ranges from about 0.8 to 1.2 equivalents per epoxide equivalent and wherein at least about 80 percent of said acid equivalents comprises said unsaturated acid and the balance between 0.01 and 20 percent comprises said polydiene, provided that the polydiene rubber content is at least about 4 weight percent.

2. The process of claim 1 wherein said polydiene rubber has a molecular weight of 2,000 to 20,000.

3. The process of claim 1 wherein said polydiene rubber molecular weight is 3,000 to 10,000.

4. The process of claim 1 wherein said polydiene rubber is a polymer of a conjugated diene monomer.

5. The process of claim 1 wherein said polydiene rubber is a copolymer of a conjugated diene and a copolymerizable vinyl monomer.

6. The process of claim 1 wherein said polydiene rubber is a copolymer of acrylonitrile and butadiene.

7. The process of claim 1 wherein said polyepoxide has an epoxide equivalent weight of 250 to 700.

8. The process of claim 1 further comprising the step of admixing the thermosettable resin with a copolymerizable monomer.

9. A thermosettable resin prepared by the process of claim 1.

10. A thermosettable resin prepared by the process of claim 2.

11. A thermosettable resin prepared by the process of claim 3.

12. A thermosettable resin prepared by the process of claim 4.

13. A thermosettable resin prepared by the process of claim 5.

14. A thermosettable resin prepared by the process of claim 6.

15. A thermosettable resin prepared by the process of claim 7.

16. A thermosettable resin prepared by the process of claim 8.

* * * * *